1,463,430

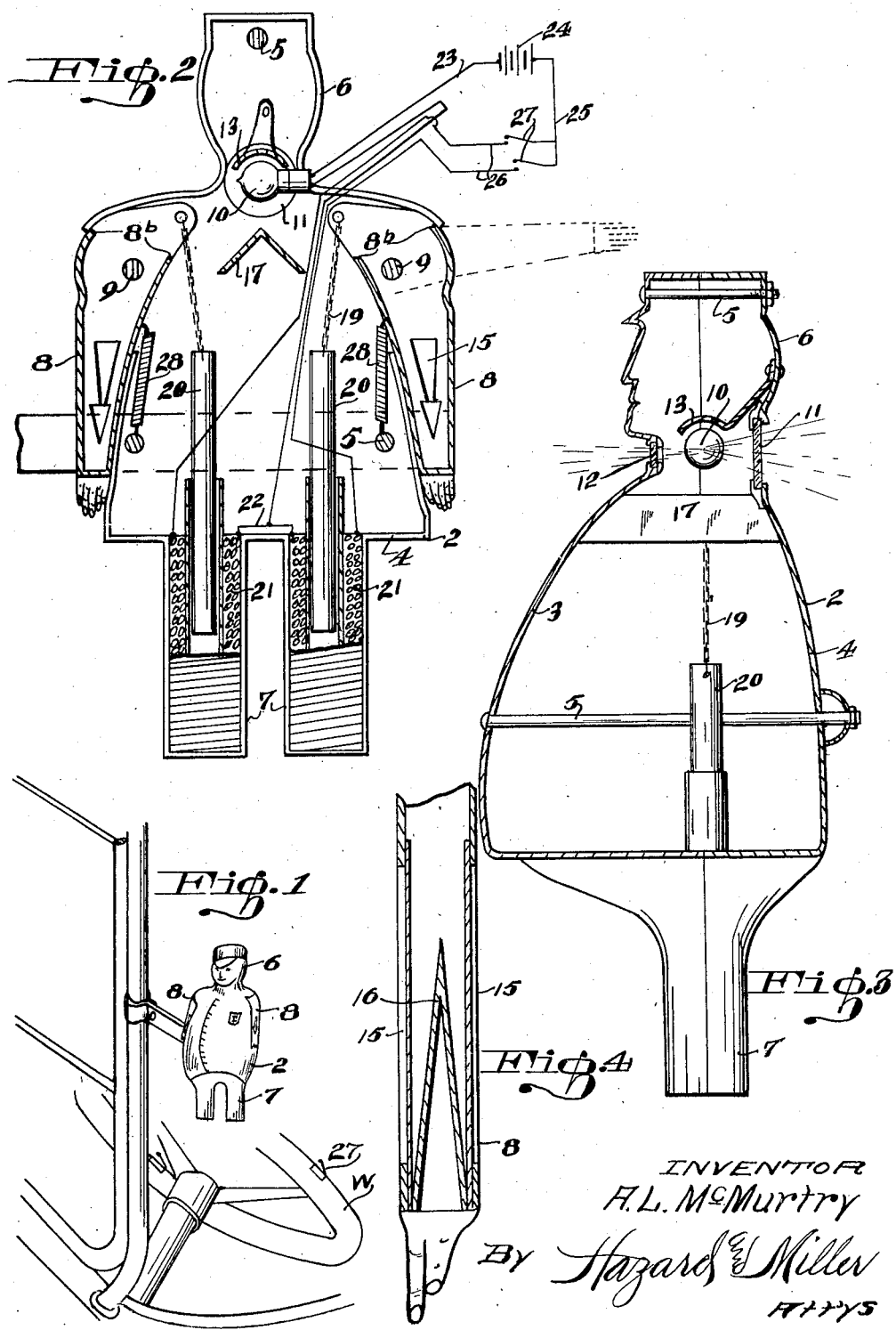
July 31, 1923. A. L. McMURTRY 1,463,430
AUTOMOBILE SIGNAL
Filed March 4, 1920
INVENTOR
A. L. McMurtry
By Hazard & Miller
Att'ys Patented July 31, 1923.

UNITED STATES PATENT OFFICE.

ASHLEY L. McMURTRY, OF DUNNVILLE, ONTARIO, CANADA.

AUTOMOBILE SIGNAL.

Application filed March 4, 1920. Serial No. 363,225.

*To all whom it may concern:*

Be it known that I, ASHLEY L. McMURTRY, a subject of the King of Great Britain, residing at Dunnville, in the Province of Ontario, Canada, have invented new and useful Improvements in Automobile Signals, of which the following is a specification.

This invention relates to automobile signals and has for its object to provide a signal member of distinctive form and characteristics in the embodiment of its casing and to provide a signal that may be readily operative to give signals as to the intended right and left hand turn of a vehicle on which it may be mounted, and with these and other objects in view the invention consists of the construction, the combination, and in details and arrangements of the parts, an embodiment of which invention is illustrated in the accompanying drawings and described and claimed hereinafter.

Figure 1 is a perspective of the improved signal figure shown as attached to a windshield support of an automobile.

Fig. 2 is a transverse vertical section of the device showing diagrammatically a circuit system.

Fig. 3 is a vertical transverse section in a plane at right angles to Fig. 2.

Fig. 4 is a plan, sectional view of one of the signal arms.

The improved signal device is embodied in a casing or box that preferably is given the configuration of a human being decorated to simulate the uniform of a policeman, the figure being designated at 2 and comprises a sectional casing that may be divided in front and rear sections 3 and 4 respectively that may be bolted together by fastening bolts or other suitable means 5 extending from the front to the back. The figure comprises the body portion with a head 6 and with legs 7 and the figure is provided with articulated arms 8—8 swinging outwardly to a perpendicular position shown in dotted lines in Fig. 2 about shoulder pivots 9—9. Within the neck of the figure there is arranged an electric light bulb 10, the rays of which may pass rearwardly through a windowed opening 11 and through a small front windowed opening 12; the rays of this light are also projected downwardly and reflected downwardly by a superjacent reflector 13.

Each of the arms 8—8 is provided in its front and rear portions with windowed openings 15 preferably of arrow shape to facilitate the interpretation of the intended signal, the arrow indicating whether a right hand or a left hand turn is to be made according to which arm is set at signalling position. The windowed openings 15 permit the light to be reflected outwardly from reflecting means 16 arranged in the camber of the arms that are made hollow and on to which mirrors or reflectors the light coming from the bulb 10 plays.

To secure the effective distribution of the light from the bulb 10 into the hollow arms and on to the reflector 16 an intermediate reflector 17 is disposed beneath the bulb 10; the faces of the reflector being set so as to throw the light laterally to pass into the arms when in the elevated position. The upper ends or shoulders of the arms are provided with openings between the side lips 8$^b$, these openings being brought into lateral opposition to the reflector 17 when the signal arms are set to signalling position.

For the purpose of throwing the arms to perpendicular position from the shoulder pivots 9—9 suitable means, preferably electrically operated and manually controlled are provided and this means in the illustrated form includes a chain or connecting part 19 for each arm and attached to the upper inner ends of the arm. The chains 19 are attached to respective cores 20 slidably mounted within solenoid coils 21, which, in the present case, are shown as arranged within the legs 7—7 of the figure and are substantially aligned below the upper inner end of the lever arm forming members. The coils 21 are connected to a common conductor 22 which is in series with the electric bulb 10 from which is extended a wire 23 to a source of current as a battery 24 the other pole of which is connected to a line 25 from which extend parallel conductors 26 connected to respective coils 21. In the lines 26 are provided switches 27 that are shown in Fig. 1 as arranged on the steering wheel W for the convenience of the operator.

From the above it will be seen that when the operator closes the circuit through either of the solenoid wires 26 the respective coil will be energized, as, for instance, the coil connected to the right hand arm, whereupon the said arm will be thrown to the outward position by the retraction of the coil rod 20 in the coil energized. Either of the signal arms can be selected at will and when thrown to the outer position the light coming from the energized bulb 10 will be projected through a signalling arm.

While the arms 8—8 may be returned to the vertical, non-signalling position by gravity, other means may be utilized to secure a rapid return, as, for instance, by connecting to the arms contractile springs 28.

Various changes may be made without departing from the spirit of my invention, as claimed.

I claim:

1. A signal device comprising a casing, hollow pivoted swinging arms secured to the casing, signal windows in the arms, a single light in the casing intermediate the hollow arms, a reflector above the light, windows in the front and back of the casing opposite the light, and a reflector below the light to reflect its rays into the hollow arms when they are in horizontal position.

2. A signal device comprising a casing, hollow pivoted swinging arms secured to the casing, signal windows in the arms, a single light in the casing intermediate the hollow arms, and a reflector adapted to reflect the rays of said light into the hollow arms when they are in horizontal position.

3. A signal device comprising a casing, hollow pivoted swinging arms secured to said casing, signal windows in said arms, reflectors in the hollow arms to reflect light outwardly through signal windows, a light in the casing intermediate the hollow arms, a reflector above the light, windows in the front and back of the casing opposite the light, and a reflector below the light to reflect its rays into the hollow arms when they are in horizontal position.

In testimony whereof I have signed my name to this specification.

A. L. McMURTRY.